(12) United States Patent  (10) Patent No.: US 8,944,033 B2
Coldren et al.  (45) Date of Patent: Feb. 3, 2015

(54) LIMP HOME CAPABLE DUAL FUEL ENGINE AND MACHINE USING SAME

(75) Inventors: Dana R. Coldren, Secor, IL (US);
Joshua W. Steffen, Mountain View, CA (US); Gregg W. Uhland, Peoria, IL (US); Brian K. Garman, Groveland, IL (US); Alan R. Stockner, Metamore, IL (US)

(73) Assignee: Caterpillar Inc., Peoria, IL (US)

( * ) Notice: Subject to any disclaimer, the term of this patent is extended or adjusted under 35 U.S.C. 154(b) by 327 days.

(21) Appl. No.: 13/606,422

(22) Filed: Sep. 7, 2012

(65) Prior Publication Data

US 2014/0069386 A1 Mar. 13, 2014

(51) Int. Cl.
*F02B 7/02* (2006.01)
*F02M 21/02* (2006.01)

(52) U.S. Cl.
CPC . *F02B 7/02* (2013.01); *F02M 21/02* (2013.01)
USPC .......................................... 123/525; 123/577

(58) Field of Classification Search
CPC .................................. F02B 7/02; F02M 21/02
USPC ............. 123/27 GE, 525, 526, 529, 575, 577, 123/481, 198 F; 701/102, 107, 112, 114
See application file for complete search history.

(56) References Cited

U.S. PATENT DOCUMENTS

| | | | |
|---|---|---|---|
| 5,553,575 A | 9/1996 | Beck et al. | |
| 6,035,837 A | 3/2000 | Cohen et al. | |
| 6,367,443 B1 | 4/2002 | Bassi et al. | |
| 6,408,625 B1 | 6/2002 | Woon et al. | |
| 6,823,835 B2 | 11/2004 | Dunsworth et al. | |
| 7,063,064 B1 | 6/2006 | Ribeiro | |
| 7,627,416 B2 | 12/2009 | Batenburg et al. | |
| 8,006,677 B2 | 8/2011 | Williams et al. | |
| 8,079,324 B2 | 12/2011 | Meyer | |
| 8,099,224 B2 | 1/2012 | Tripathi et al. | |
| 2010/0050993 A1 | 3/2010 | Zhao et al. | |
| 2011/0301826 A1 | 12/2011 | Galindo et al. | |

*Primary Examiner* — Mahmoud Gimie
(74) *Attorney, Agent, or Firm* — Baker Hostetler

(57) ABSTRACT

A dual fuel engine powers a machine by burning natural gas and liquid diesel fuel. When operating in a low load mode, some of the engine cylinders are fueled with a high ratio of diesel/gas, and the remaining cylinders are unfueled. When operating in a high load mode, all of the engine cylinders are fueled with a low ratio of diesel/gas. When operating in a limp home mode, the fuel injectors are configured to inject only diesel fuel into all of the plurality of engine cylinders.

14 Claims, 3 Drawing Sheets

LIMP HOME CAPABLE DUAL FUEL ENGINE AND MACHINE USING SAME

TECHNICAL FIELD

The present disclosure relates generally to operational strategies for dual fuel engines, and more particularly, fueling an engine according to one of a low load algorithm, a high load algorithm and a limp home algorithm.

BACKGROUND

The manufacturers of engines and their associated machines are increasingly considering natural gas as a fueling option. One such strategy includes configuring a compression ignition engine to be supplied with both liquid diesel fuel and natural gas. In a typical scenario, a large charge of natural gas is ignited by first compression igniting a small diesel pilot injection quantity of fuel. U.S. Pat. No. 7,627,416, for example, teaches a method and apparatus for operating a dual fuel internal combustion engine when the primary fuel (e.g. natural gas) becomes unavailable, requiring operation of the engine with the secondary fuel (e.g. liquid diesel) alone. Thus, while the art recognizes a potential need to operate a dual fuel engine on some occasions using only liquid diesel fuel, designing and constructing a fuel system that is commercially viable has remained problematic. For instance, providing a fuel injector that can be appropriately controlled to not only inject tiny pilot quantities to compression ignite larger charges of gaseous fuel, while at the same time having the ability to inject relatively large quantities of liquid diesel fuel when the natural gas system is unavailable, provides two divergent constraints on the fuel system that are difficult to reconcile.

The present disclosure is directed toward one or more problems set forth above.

SUMMARY

In one aspect, a machine includes a machine body supported by a conveyance. A dual fuel compression ignition engine has a plurality of cylinders, and is attached to the machine body and operably coupled to the conveyance. A dual fuel system is operably coupled to supply the dual fuel compression ignition engine with liquid diesel fuel and natural gas fuel from a single fuel injector directly into respective engine cylinders. An electronic controller is in control communication with the dual fuel system and has a low load algorithm, a high load algorithm, and a limp home algorithm each configured to control operation of the dual fuel system. In the low load algorithm, the fuel injector is configured to inject a high ratio of diesel fuel to natural gas fuel into less than all of the plurality of engine cylinders in each engine cycle, and inject no diesel fuel or natural gas into the remaining engine cylinders. The high load algorithm is configured to inject a low ratio of diesel fuel to natural gas fuel into all of the plurality of engine cylinders. The limp home algorithm is configured to inject only diesel fuel into all of the plurality of engine cylinders.

In another aspect, a method of operating a machine includes idling a machine, moving the machine with a load, and limping the machine home. When idling, some, but not all, of the engine cylinders are supplied with a high ratio of liquid diesel fuel to natural gas fuel. During the moving step all of the cylinders are fueled with a low ratio of liquid diesel fuel to natural gas fuel. The limping step includes fueling all of the cylinders exclusively with liquid diesel fuel.

DETAILED DESCRIPTION

Figure 1:
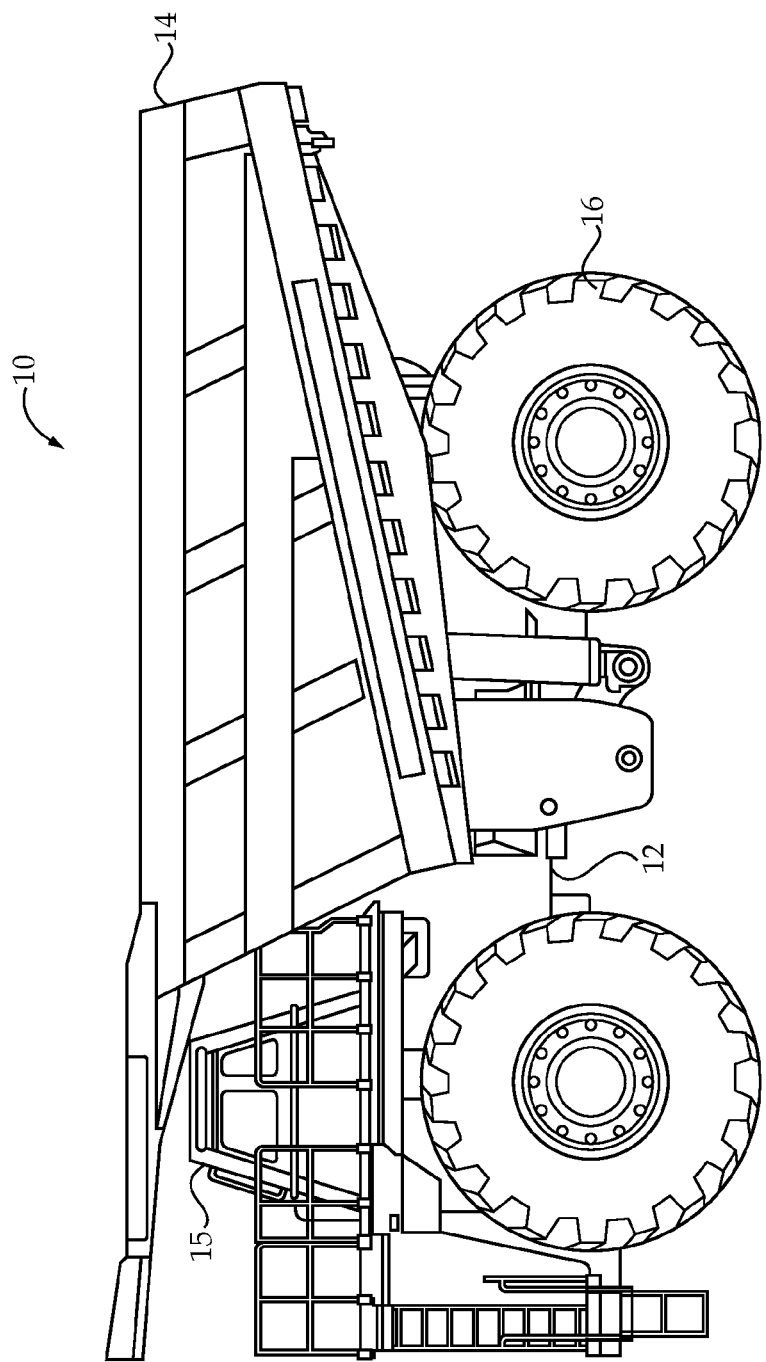
FIG. 1 is a side view of a machine according to the present disclosure.

Referring initially to FIG. 1, a machine 10 includes a machine body 12 supported by a conveyance 16. In the illustrated embodiment, machine 10 may comprise a mining truck and the conveyance 16 may comprise wheels. Nevertheless, those skilled in the art will appreciate that machine 10 could be any type of mobile machine, and the conveyance 16 could be different, including by not limited to tracks or maybe even a propeller in the case of a seagoing vessel. Machine 10 may include an operator control station 15 and a dump body 14 for transferring added loads, such as ore at a mining site. When in operation, especially in the case of a mining truck 10, one could expect a typical duty cycle to include substantial periods in which the machine 10 is not moving and is idle while waiting to re-fuel, pick up a load, or dump a load. In different parts of the duty cycle, machine 10 could be expected to haul a heavy load of ore in dump bed 14 up a steep grade at a mining site to bring the raw ore to a processing site where it is dumped. On one hand, during idling, machine 10 needs only consume a relatively miniscule amount of fuel. On the other hand, when carrying a heavy load up a steep grade, machine 10 must consume relatively large quantities of fuel. These two extremes can make it difficult to design an engine that can operate efficiently at both extremes and everywhere in between.

Figure 2:
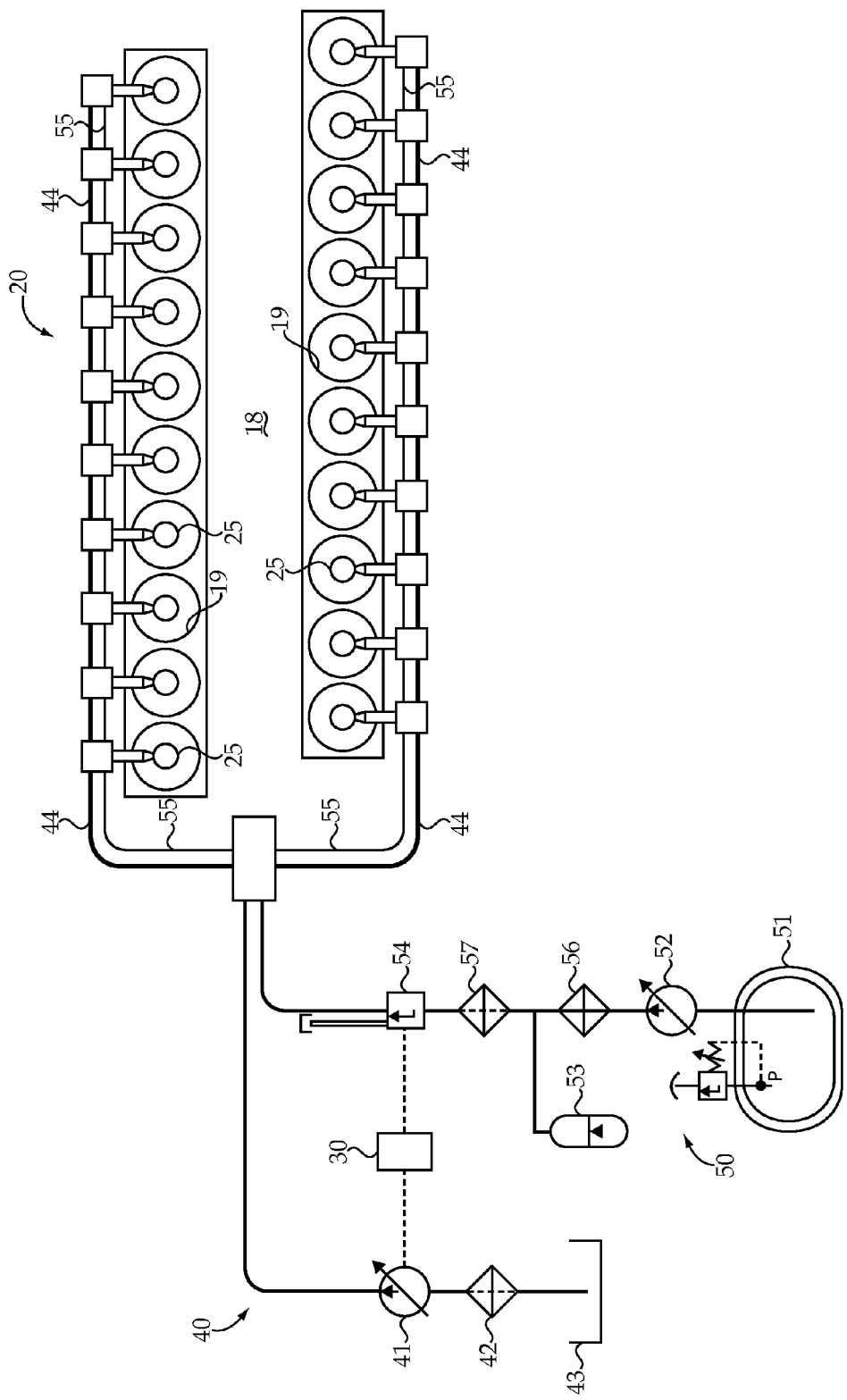
FIG. 2 is a schematic view of a dual fuel engine for powering the machine of FIG. 1.

Referring additionally to FIG. 2, an example dual fuel engine is illustrated for powering the machine 10 of FIG. 1. In the illustrated example, dual fuel compression ignition engine 18 has a plurality of engine cylinders 19. Engine 18 may be attached to machine body 12 and operably coupled to the conveyance 16. In the illustrated embodiment, engine 18 includes twenty cylinders. However, those skilled in the art will appreciate that an engine having any number of cylinders would still fall within the intended scope of present disclosure. A dual fuel system 20 is operably coupled to supply dual fuel compression ignition engine 18 with liquid diesel fuel and natural gas fuel from a single fuel injector 25 directly into respective engine cylinders 19. In other words, each engine cylinder 19 includes exactly one fuel injector for injecting both liquid diesel and natural gas fuel directly into the respective engine cylinders. An electronic controller 30 is in control communication with the dual fuel system 20 and is configured to execute a low load algorithm, a high load algorithm and a limp home algorithm that are each configured to control operation of dual fuel system 20. The low load algorithm may be particularly applicable when machine 10 is not moving and engine 18 is idling. The high load algorithm may be particularly applicable to operation of machine 10 when moving and carrying a heavy load in dump body 14. The limp home algorithm may correspond to operation of machine 10 when the onboard natural gas fuel supply is exhausted, shut down or malfunctioning. Preferably, the machine 10 can still maneuver with a full load in dump body 14, although not at top speed, when operating according to the limp home algorithm.

Although not necessary, dual fuel system 20 may include a diesel fuel supply system 40 and a natural gas supply system 50 that are carried on machine body 12. Diesel fuel supply system 40 may include a high pressure pump 41 that draws low pressure liquid diesel fuel from a tank 43 through a filter 42. An outlet from the high pressure pump 41 supplies fuel, and controls pressure in, a liquid fuel common rail 44. Liquid fuel common rail 44 is in turn fluidly connected to each individual fuel injector 25 in a known manner. The natural gas fuel supply system 50 may include a cryogenic tank 51, a variable displacement pump 52, a heat exchanger 56 an accumulator 53, a filter 57 and a fuel conditioning module 54 that supplies gaseous fuel to, and controls pressure in, a gaseous fuel common rail 55. Gaseous fuel common rail 55 is also fluidly connected to the individual fuel injectors 25 in a known manner, such as via a coaxial quill assembly.

Figure 3:
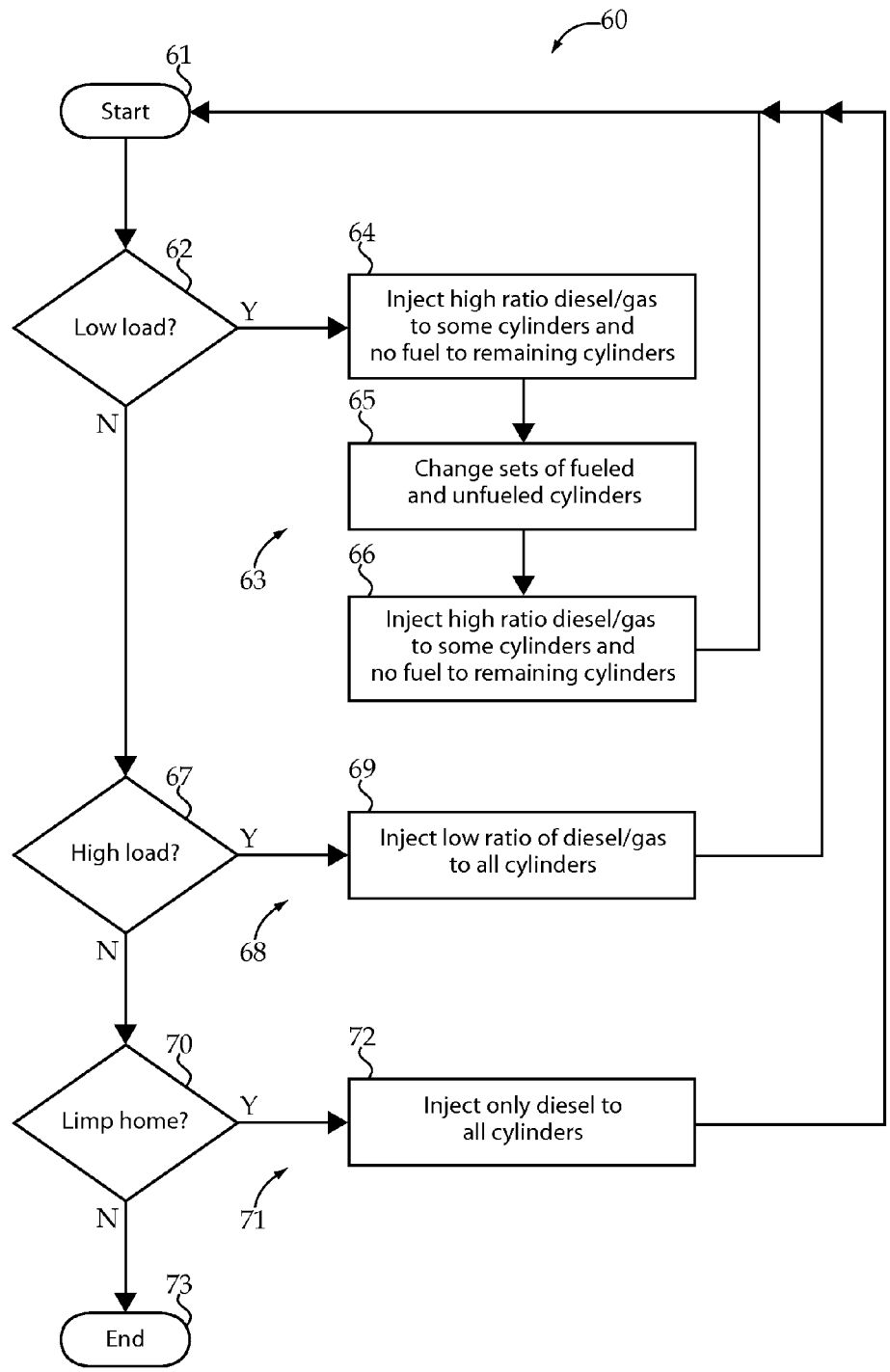
FIG. 3 is a fueling algorithm flow diagram according to another aspect of the present disclosure.

Referring in addition to FIG. 3, a fueling algorithm 60 according to the present disclosure begins at start 61. At query 62, the logic determines whether to execute a low load algorithm 63. If not, the logic proceeds to query 67 where it is determined whether to execute a high load algorithm 68. If not, the logic queries at 70 whether to execute a limp home algorithm 71. If not, the logic ends at 73. If the low load algorithm 63 is deemed appropriate, such as machine 10 is not moving and engine 18 is idling, the low load algorithm will command fuel injectors 25 to inject a high ratio of diesel fuel to gaseous fuel to some of the engine cylinders 19 while supplying no fuel to the remaining cylinders. Those skilled in the art will appreciate that cylinder cut out strategies are known and that depending upon the number and configuration of engine cylinders 19, different subsets of the available engine cylinders 19 can be fueled and engine 18 operated in a balanced manner. Electronic controller 30 may include two or more different sets of fueled and un-fueled cylinder sets identified for use during the low load algorithm 63. One could expect electronic controller 30 to change the sets of fueled and un-fueled cylinders at block 65 on some periodic bases utilizing known considerations. After changing the sets of fueled and un-fueled cylinders, the low load algorithm may then at block 66 cause fuel injectors 25 to again inject a high ratio of diesel fuel to gaseous fuel to a different sub-set of cylinders while supplying no fuel to the remaining cylinders. After block 66, the logic may loop back to start 61. A high ratio of diesel to gas includes injection of exclusively diesel with no injection of gas.

If the fuel oriented algorithm determines at query 67 to execute the high load algorithm 68, the electronic controller 30 may command all of the fuel injectors 25 to inject a low ratio of diesel fuel to gaseous fuel to all of the engine cylinders 19 at block 69. For instance, if machine 10 is carrying a load of ore in dump body 14 while traveling an uphill grade, the full powering capacity of engine 18 may be needed. As used in the disclosure, a low ratio is smaller than a high ratio. At the low ratio, a majority of the heat release in each engine cylinder 19 may still be provided by natural gas. As used in the present disclosure, either of the high ratio or low ratio is based upon the heat release or energy released into the engine cylinder upon combustion of the prospective liquid diesel fuel or gaseous fuel. In other words, the ratios may be determined not by the relative volume of each fuel supplied in the engine cylinders via fuel injectors 25, but instead by the ratio of heat release or energy delivered to the respective engine cylinder by the combustion of the respective liquid of fuel and gaseous fuel.

If the fueling algorithm 60 determines that it is appropriate to operate according to the limp home algorithm 71, the electronic controller 30 is configured to command all of the fuel injectors 25 to inject only or exclusively liquid diesel fuel into all of the engine cylinders 19 at block 72. One could expect the limp home algorithm to be utilized when the on-board supply of natural gas fuel is exhausted, shut down or otherwise malfunctioning while there is a need for machine 10 to maneuver. In order to provide the necessary power, one could expect substantial quantities of liquid diesel fuel to be injected into each engine cylinder 19 while operating according to the limp home algorithm 71. This extreme is to be contrasted with the small pilot injection quantities necessary for operating engine 18 according to either the low load algorithm 63 or the high load algorithm 68.

One strategy to relax the extreme requirements on the individual fuel injectors 25 might be to operate fuel system 20 such that natural gas fuel is maintained at a medium pressure in gaseous fuel common rail 55 while liquid diesel fuel is maintained at a medium high pressure in the liquid fuel common rail when operating according to either the high load algorithm or the low load algorithm. Those skilled in the art will appreciate that maintaining the liquid fuel common rail 44 at a medium high pressure over the medium pressure of the gaseous fuel common rail 55 can serve the dual purpose of inhibiting migration of gaseous fuel into the liquid fuel spaces in fuel system 12, allow diesel fuel to lubricate guide clearances in fuel injectors 25 and also allow for longer injection durations that are easier to control. Still, one could expect that the amount of liquid diesel fuel injected at the medium high pressure from the individual fuel injectors 25 to be associated with being at or near the minimum control quantity of liquid fuel that can be reliably and repeatedly injected from each individual fuel injector 25. Thus, one extreme end of the design capability for fuel system 20 would be to reliably and consistently inject small pilot diesel fuel quantities necessary for operation of engine 18 at either a low load, a high load or any condition there between. Powering engine 18 by fueling less than all of the engine cylinders 19 further relaxes this performance specification on fuel system 20 since more fuel can be injected into the fuel cylinders than would otherwise be possible if the engine continued to operate by being fueled in all engine cylinders 19 when operating in an idling or low load condition. In some instances, the fueling demand by engine 18 when idling may be so low that only liquid diesel fuel is injected into less than all of the engine cylinders 19.

When operating according to the limp home algorithm 71, one might expect electronic controller 30 to increase liquid diesel fuel pressure in the liquid fuel common rail 44 so that fuel injectors 25 can inject an adequate amount of fuel into each engine cylinder in the duration available. One might also expect that the gaseous fuel common rail would be set at or would naturally assume a low pressure during execution of the limp home algorithm. In all cases, low pressure is lower than medium pressure, which is lower than medium high pressure, which is lower than high pressure. Thus, when operating in a high load algorithm, the fuel injectors 25 continue to inject natural gas fuel at a medium pressure and inject liquid diesel fuel at a medium high pressure. On the other hand, during execution of the limp home algorithm, the fuel injectors 25 might be configured to inject exclusively the liquid diesel fuel at a high pressure.

INDUSTRIAL APPLICABILITY

The present disclosure is generally applicable to any machine that utilizes a dual fuel compression ignition engine. The present disclosure finds particular applicability to machines, such as mining trucks, that are powered by engines with many cylinders that afford more opportunities to cut out or leave some engine cylinders unfueled during low power demand situations, such as when the machine is idling. The present disclosure also finds general applicability to designing a dual fuel system with capability of fueling a compression ignition engine 18 during low load operation, high load operation, all partial load operations in between, and also during limp home modes of operation when the natural gas fuel supply becomes unavailable.

One could expect the duty cycle for machine 10 to include idling machine 10, moving the machine 10 with a load, and sometimes limping the machine 10 home. When idling, dual fuel system 20 will fuel some, but not all, of the cylinders 19 with a high ratio of liquid diesel fuel to natural gas fuel. When machine 10 is moving, one could expect system 20 to fuel all of the cylinders 19 with a low ratio of liquid diesel fuel to natural gas fuel. When limping home, system 20 will fuel all of the cylinders exclusively with liquid diesel fuel. When idling, one could expect the electronic controller 30 to periodically change among different sets of engine cylinders 19 that are fueled, and cut out in different engine cycles. When moving, electronic controller 30 may command fuel system 20 to inject natural gas fuel at a medium pressure and inject liquid diesel fuel at a medium high pressure. On the other hand, when limping home, one could expect electronic controller 30 to inject liquid diesel fuel at a high pressure. Those skilled in the art will appreciate that liquid diesel fuel may not only constitute an injection fuel medium, but might also function as a control fluid in the individual fuel injectors 25. In such a case, one could expect small quantities of liquid diesel fuel to be returned from the fuel injectors 25 back to tank 43 at a low pressure during all of the idling, moving and limping home modes of operation of machine 10.

When fueled, machine 10 may store liquefied natural gas in cryogenic tank 51, and liquid diesel fuel in tank 43. The gas pressure in gaseous fuel common rail 55 may be controlled with a conditioning module 54 that is fluidly connected to cryogenic tank 51. In the illustrated embodiment, gaseous fuel is supplied to the fuel injectors 25 from gaseous fuel common rail 55, whereas liquid diesel fuel is supplied to the fuel injectors 25 of the liquid fuel common rail 44.

By operating engine 18 while fueling some, but not all of the engine cylinders 19 during idling, and doing so with liquid diesel fuel pressure at a medium high pressure, one can more easily design fuel system 20 in general, and fuel injectors 25 in particular to have a minimum controllable liquid fuel injection quantity that is realistically possible. In addition, this strategy may allow for a larger minimum injection quantity performance from each individual fuel injector 25, which will better enable injection of relatively large quantities of liquid diesel fuel at high pressure when operating in a limp home mode. These two constraints may allow machine 10 to reliably operate at extreme fueling conditions while retaining the ability to utilize as much natural gas fuel as possible. This characteristic is sometimes referred to as a diesel substitution factor. In otherwords, the present disclosure recognizes that there is a tradeoff between limp home capability and a minimum liquid diesel delivery capability. In general, higher delivery requirements are needed for limp home, which may correspond to larger nozzle orifices, large flow areas and high operating pressures. However, larger flow areas undermine the ability of the same fuel injector to inject the small pilot liquid diesel fuel injection quantities necessary to effectively ignite a larger natural gas fuel charge. By providing a cylinder cut out strategy during low load and maybe partial load operation, the required fueling per cylinder in turn increases, and along with the minimum diesel delivery quantity necessary for those fueled cylinders. This strategy improves the diesel substitution factor while utilizing as much natural gas as possible at all operating conditions. As discussed earlier, the active or fueled cylinders may be rotated through the firing order in order to keep all cylinders 19 firing at one time or another during low load engine operation. Changing among different sets of fueled and un-fueled cylinders can potentially avoid thermal issues, coking issues, and provide more even wear rates among different engine cylinders. As the engine transitions from a low load operation to a partial load, a lesser number of cylinders 19 may be cut out. As load builds somewhere between low load an high load, all cylinders 19 may be fueled with both gaseous fuel ignited with a pilot quantity of liquid diesel.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine comprising:
a machine body supported by a conveyance;
a dual fuel compression ignition engine having a plurality of cylinders, being attached to the machine body and operably coupled to the conveyance;
a dual fuel system operably coupled to supply the dual fuel compression ignition engine with liquid diesel fuel and natural gas fuel from a single fuel injector directly into respective engine cylinders;
an electronic controller in control communication with the dual fuel system and having a low load algorithm, a high load algorithm and a limp home algorithm each configured to control operation of the dual fuel system;
wherein the low load algorithm is configured to inject a high ratio diesel fuel to natural gas fuel into less than all of the plurality of engine cylinders in each engine cycle, and inject no diesel fuel or natural gas fuel into the remaining engine cylinders;
wherein the high load algorithm is configured to inject a low ratio of diesel fuel to natural gas fuel into all of the plurality of engine cylinders; and
wherein the limp home algorithm is configured to inject only diesel fuel into all of the plurality of engine cylinders.

2. The machine of claim 1 wherein the low load algorithm is configured to change among different sets of engine cylinders that are fueled and cut out in different engine cycles.

3. The machine of claim 1 wherein the high load algorithm is configured to inject natural gas fuel at a medium pressure and inject liquid diesel fuel at a medium high pressure; and
the limp home algorithm is configured to inject liquid diesel fuel at a high pressure.

4. The machine of claim 1 wherein the dual fuel system includes a gaseous fuel common rail, a cryogenic liquefied natural gas tank and a conditioning module for controlling pressure in the gaseous fuel common rail.

5. The machine of claim 4 wherein the low load algorithm is configured to change among different sets of engine cylinders that are fueled and cut out in different engine cycles.

6. The machine of claim 4 wherein the high load algorithm is configured to inject natural gas fuel at a medium pressure and inject liquid diesel fuel at a medium high pressure; and
the limp home algorithm is configured to inject liquid diesel fuel at a high pressure.

7. The machine of claim 6 wherein the low load algorithm is configured to change among different sets of engine cylinders that are fueled and cut out in different engine cycles.

8. A method of operating a machine that includes a machine body supported by a conveyance; a dual fuel compression ignition engine having a plurality of cylinders, being attached to the machine body and operably coupled to the conveyance; a dual fuel system operably coupled to supply the dual fuel compression ignition engine with liquid diesel fuel and natural gas fuel from a single fuel injector directly into respective engine cylinders; and an electronic controller in control communication with the dual fuel system and having a low load algorithm, a high load algorithm and a limp home algorithm each configured to control operation of the dual fuel system, the method comprising the steps of:

idling the machine;

moving the machine with a load;

limping the machine home;

the idling step includes fueling some, but not all, of the cylinders with a high ratio of liquid diesel fuel to natural gas fuel;

the moving step includes fueling all of the cylinders with a low ratio of liquid diesel fuel to natural gas fuel; and the limping step includes fueling all of the cylinders exclusively with liquid diesel fuel.

9. The method of claim 8 wherein the idling step includes changing among different sets of engine cylinders that are fueled and cut out in different engine cycles.

10. The method of claim 8 wherein moving step includes injecting natural gas fuel at a medium pressure and injecting liquid diesel fuel at a medium high pressure; and the limping step includes injecting liquid diesel fuel at a high pressure; and returning liquid diesel fuel from the fuel injectors back to tank at a low pressure during all of the idling, moving and limping steps.

11. The method of claim 8 including the steps of storing liquefied natural gas in a cryogenic tank;

controlling gas pressure in a gaseous fuel common rail with a conditioning module fluidly connected to the cryogenic tank;

supplying gaseous fuel to the fuel injectors from the gaseous fuel common rail; and supplying liquid diesel fuel to the fuel injectors from a liquid fuel common rail.

12. The method of claim 11 wherein the idling step includes changing among different sets of engine cylinders that are fueled and cut out in different engine cycles.

13. The method of claim 11 wherein moving step includes injecting natural gas fuel at a medium pressure and injecting liquid diesel fuel at a medium high pressure; and the limping step includes injecting liquid diesel fuel at a high pressure; and returning liquid diesel fuel from the fuel injectors back to tank at a low pressure during all of the idling, moving and limping steps.

14. The method of claim 13 wherein the idling step includes changing among different sets of engine cylinders that are fueled and cut out in different engine cycles.

\* \* \* \* \*